United States Patent
Dudar et al.

(10) Patent No.: US 12,296,824 B2
(45) Date of Patent: May 13, 2025

(54) CARGO OVERHANG SYSTEM AND METHOD

(71) Applicant: Ford Global Technologies, LLC, Dearborn, MI (US)

(72) Inventors: Aed M. Dudar, Canton, MI (US); Scott A. Bohr, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 17/932,678

(22) Filed: Sep. 16, 2022

(65) Prior Publication Data
US 2024/0092362 A1 Mar. 21, 2024

(51) Int. Cl.
*B60W 30/16* (2020.01)
*B60W 30/12* (2020.01)
*B60W 30/14* (2006.01)
*B60W 30/18* (2012.01)

(52) U.S. Cl.
CPC ........... *B60W 30/16* (2013.01); *B60W 30/12* (2013.01); *B60W 30/143* (2013.01); *B60W 30/18163* (2013.01); *B60W 2554/402* (2020.02); *B60W 2554/4049* (2020.02); *B60W 2756/10* (2020.02)

(58) Field of Classification Search
CPC .... B60W 30/16; B60W 30/12; B60W 30/143; B60W 30/18163; B60W 2554/402
USPC .......................................................... 701/96
See application file for complete search history.

(56) References Cited

U.S. PATENT DOCUMENTS

| | | | | |
|---|---|---|---|---|
| 9,488,482 B2 * | 11/2016 | Chan | ............... | G08G 1/165 |
| 9,586,549 B2 | 3/2017 | Chambers | | |
| 10,207,707 B2 * | 2/2019 | Kurata | ............... | G06V 20/584 |
| 11,891,036 B2 * | 2/2024 | Costin | ............... | B60T 8/172 |
| 2015/0066349 A1 * | 3/2015 | Chan | ............... | G01C 21/3697 |
| | | | | 701/400 |
| 2019/0176687 A1 * | 6/2019 | Nagata | ............... | B60W 40/13 |
| 2019/0287262 A1 * | 9/2019 | Hilnbrand | ............... | G06V 20/58 |
| 2020/0101967 A1 | 4/2020 | Seki | | |
| 2022/0366792 A1 * | 11/2022 | Gaß | ............... | G08G 1/168 |
| 2023/0162508 A1 * | 5/2023 | Xia | ............... | B60W 60/00274 |
| | | | | 382/104 |
| 2023/0260288 A1 * | 8/2023 | Young | ............... | G06V 20/56 |
| | | | | 382/104 |
| 2024/0025303 A1 * | 1/2024 | Zethraeus | ............... | G01S 13/91 |

* cited by examiner

*Primary Examiner* — Yazan A Soofi
(74) *Attorney, Agent, or Firm* — Frank A. MacKenzie; Brooks Kushman P.C.

(57) ABSTRACT

A system and method performed by a first vehicle may include receiving a message from a second vehicle regarding a cargo overhang condition of the second vehicle in which an object carried by the second vehicle extends beyond a perimeter or envelope of the second vehicle, and adjusting an operation of the first vehicle based upon the cargo overhang condition of the second vehicle.

18 Claims, 3 Drawing Sheets

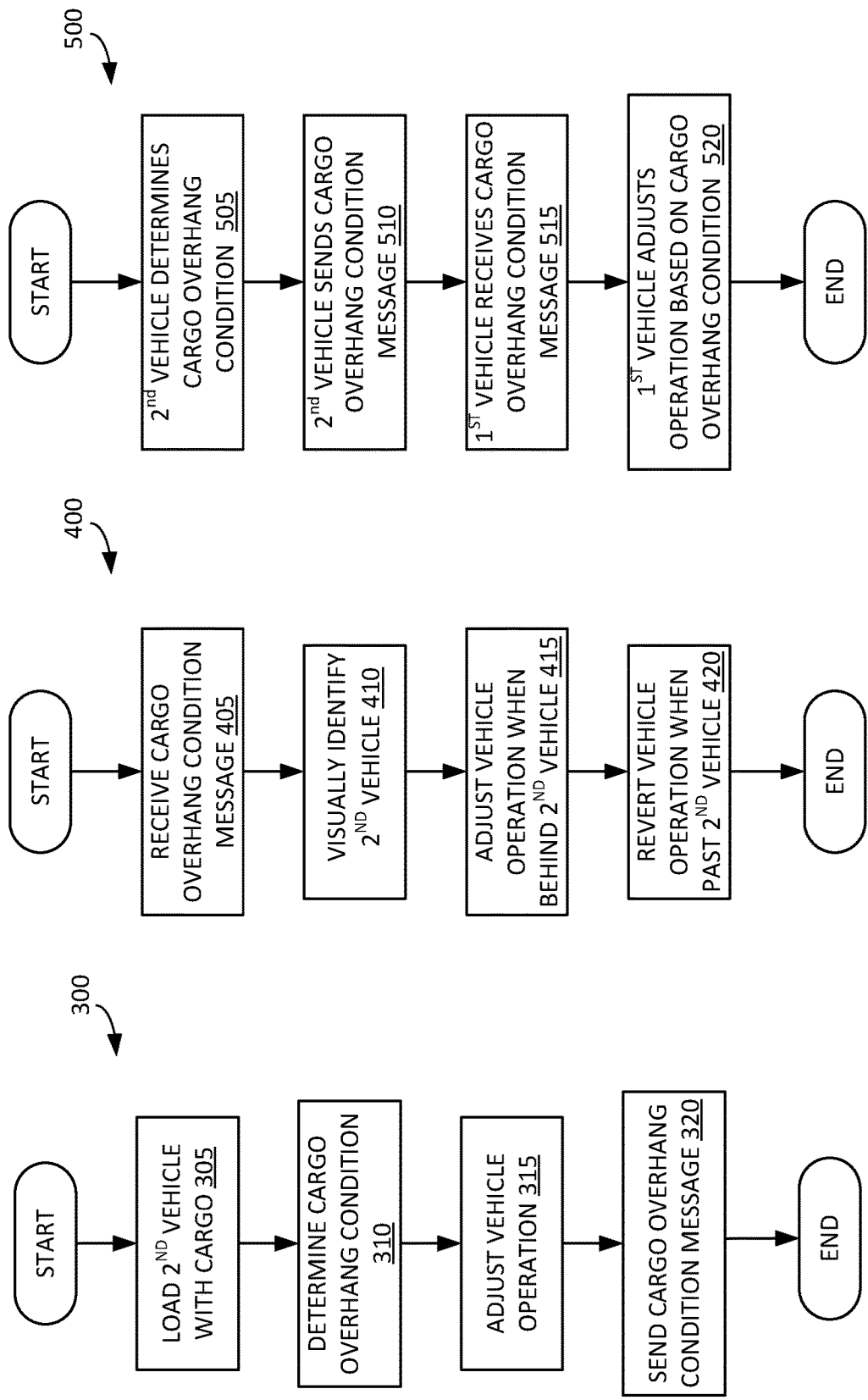

CARGO OVERHANG SYSTEM AND METHOD

BACKGROUND

Road vehicles may carry cargo that extends beyond the height, length, or width of the vehicle itself (i.e., the vehicular envelope) in accordance with applicable regulations, if any. For example, a pickup truck, a van, or an SUV may carry lumber that extends from the rear of the vehicle. Vehicles with roof racks may carry items such as ladders, bedding, rooftop boxes, rooftop tents, bicycles, skis, paddleboards, surfboards, canoes, or kayaks that extend above the vehicle and may be longer and/or wider than the vehicle. Similarly, vehicles may have rear or hitch mounted racks for coolers, bikes, etc. that extend from the rear of the vehicle and may also extend beyond the width or height of the vehicle.

Some vehicles such as work trucks may be modified to have structures such as a bucket or boom affixed to the vehicle. These structures typically extend above the original truck height and may extend longitudinally and/or laterally as well.

BRIEF DESCRIPTION OF THE DRAWINGS

FIG. 3 is a flow diagram of a cargo overhang condition process in a second vehicle.

FIG. 4 is a flow diagram of a cargo overhang condition operation in a first vehicle.

FIG. 5 is a flow diagram of a combined process to adjust an operation of a first vehicle based on a cargo overhang condition of a second vehicle.

DETAILED DESCRIPTION

Figure 1:
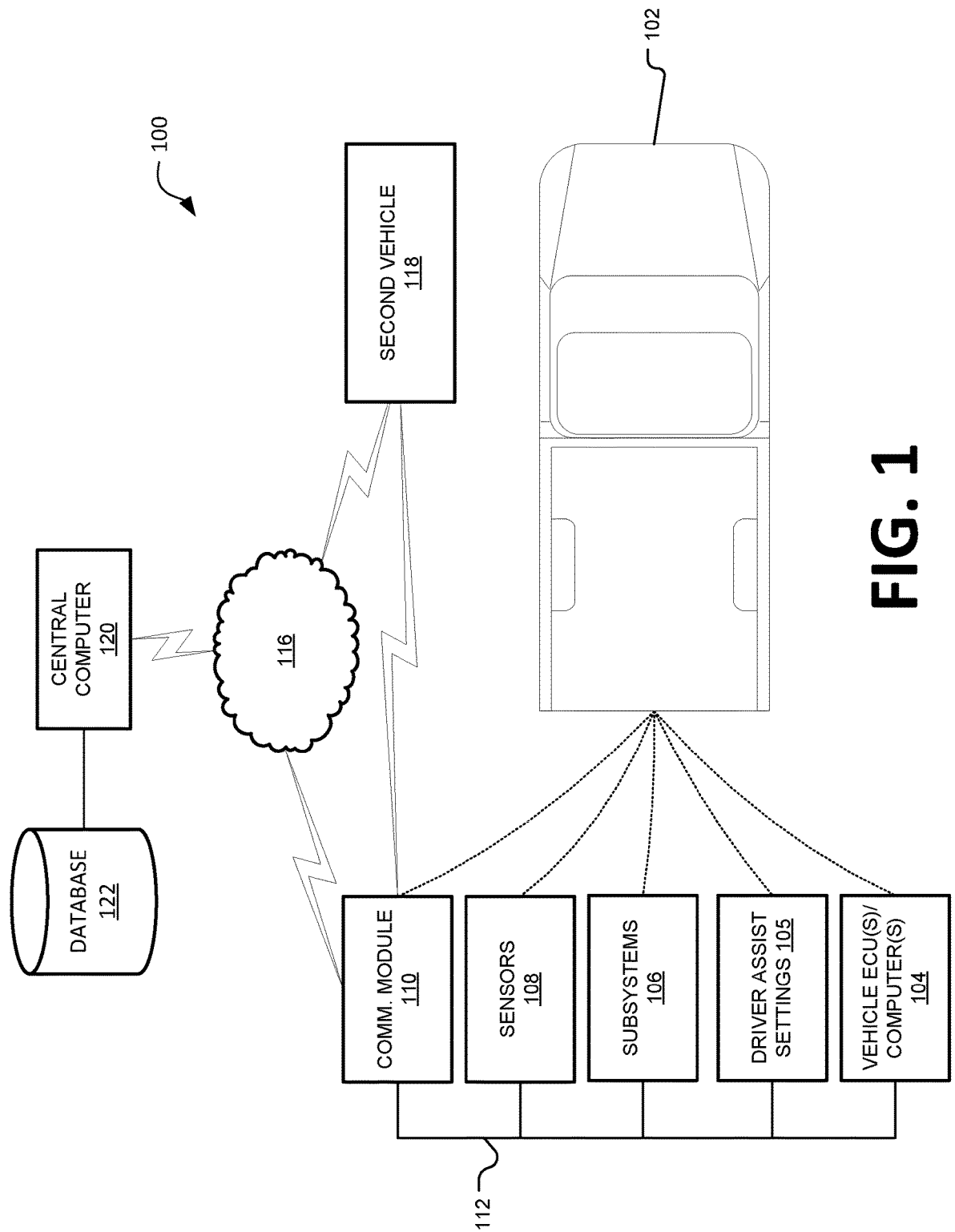
FIG. 1 is a diagram of an example system for adjusting vehicle driver assistance setting based on a cargo overhang condition of a second vehicle.

As used herein, when a vehicular cargo or added structure extends beyond the height, length, or width of the vehicle itself (i.e., the vehicular envelope) is referred to as a cargo overhang condition.

Vehicles are increasingly being supplied with advanced driver assistance systems (ADAS) such as emergency braking, adaptive cruise control, lane keeping assist, lane centering assist, parking assist, blind spot monitoring, rear cross traffic alert, etc.

In accordance with the present disclosure, a first vehicle may share a roadway with a second vehicle. The second vehicle may use a camera, a sensor, or user input to obtain dimension data of a cargo overhang condition. The second vehicle may adjust one or more of its driver assistance systems to account for the cargo overhang condition, and then transmit a message to let other nearby vehicles, such as the first vehicle, know that the second vehicle has the cargo overhang condition so that the first vehicle may adjust its operation based on the overhang condition, such as by adjusting one or more of its driver assistance systems.

In one or more implementations of the present disclosure, a system includes a computer for a first vehicle, the computer having a processor and a memory storing instructions executable by the processor to: receive a message from a second vehicle, the message including a cargo overhang condition of the second vehicle in which an object carried by the second vehicle extends beyond a perimeter or envelope of the second vehicle; and adjust an operation of the first vehicle based upon the cargo overhang condition of the second vehicle.

In an implementation, the instructions to adjust the operation of the first vehicle may include instructions to adjust a driver assistance system of the first vehicle.

In a further implementation, the instructions to adjust the driver assistance system may include instructions to adjust a parameter selected from a follow distance of an adaptive cruise control, an acceleration or deceleration rate of the adaptive cruise control, a lane change setting of the adaptive cruise control, a sensitivity or activation distance of an emergency braking system, a sensitivity or distance of a lane keeping system, a sensitivity or distance of a rear cross traffic alert system, and/or a sensitivity or distance of a blind spot monitoring system.

In an implementation, the cargo overhang condition may include overhang dimensions in a length direction, in a width direction, and/or in a height direction.

In another implementation, the system may further include instructions to visually identify the second vehicle.

In an implementation, the instructions to visually identify the second vehicle may include instructions to detect flashing hazard lights of the second vehicle with a camera on the first vehicle.

In another implementation, the instructions to detect flashing hazard lights of the second vehicle may include instructions to detect a code in a pattern of the flashing hazard lights.

In a further implementation, the message from the second vehicle may be received at the first vehicle using a short-range vehicle-to-vehicle (V2V) wireless communication.

In another implementation, the message from the second vehicle may be received at the second vehicle in a coded transmission from a controlled flashing of hazard lights on the second vehicle.

In another implementation, the instructions to adjust the operation of the first vehicle may be configured to operate when the first vehicle is behind or laterally adjacent to the second vehicle.

In one or more implementations of the present disclosure, a method performed at a first vehicle may include: receiving a message from a second vehicle, the message including a cargo overhang condition of the second vehicle in which an object carried by the second vehicle extends beyond a perimeter or envelope of the second vehicle; and adjusting an operation of the first vehicle based upon the cargo overhang condition of the second vehicle.

In an implementation, adjusting the operation of the first vehicle may include adjusting a driver assistance system of the first vehicle.

In another implementation, adjusting the driver assistance system may include adjusting a parameter selected from a follow distance of an adaptive cruise control, an acceleration or deceleration rate of the adaptive cruise control, a lane change setting of the adaptive cruise control, a sensitivity or activation distance of an emergency braking system, a sensitivity or distance of a lane keeping system, a sensitivity or distance of a rear cross traffic alert system, and/or a sensitivity or distance of a blind spot monitoring system.

In a further implementation, the cargo overhang condition may include overhang dimensions in a length direction, in a width direction, and/or in a height direction.

In an implementation, the method may further include visually identifying the second vehicle.

In another implementation, visually identifying the second vehicle may include instructions to detect flashing hazard lights of the second vehicle with a camera on the first vehicle.

In a further implementation, detecting flashing hazard lights of the second vehicle may include detecting a code in a pattern of the flashing hazard lights.

In yet another implementation, the message from the second vehicle may be received at the first vehicle using a short-range vehicle-to-vehicle (V2V) wireless communication.

In an implementation, the message from the second vehicle may be received at the second vehicle in a coded transmission from a controlled flashing of hazard lights on the second vehicle.

In another implementation, the adjusting of the operation of the first vehicle may operate when the first vehicle is behind or laterally adjacent to the second vehicle.

With reference to FIG. 1, a connected vehicle system 100 can provide communications between a vehicle 102, one or more second vehicles 118 (that may have a cargo overhang condition), and a central computer 120, to share data among these various entities.

Although illustrated only with respect to vehicle 102, each of the vehicles 102 and 118 is a set of components or parts, including hardware components and typically also software and/or programming, to perform a function or set of operations in the respective vehicle 102 and 118. For ease of description, only these components of vehicle 102 will be described with respect to FIG. 1.

Vehicle subsystems 106 typically include a braking system, a propulsion system, and a steering system as well as other subsystems including but not limited to an advanced driver assist system (ADAS), a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers or electronic control units (ECUs) 104 (sometimes referred to herein as vehicle computer 104), processors in second vehicle 118, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more computers/ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more ECUs/computers 104 can be included in a vehicle 102 that may be any suitable type of ground vehicle, e.g., a passenger or commercial automobile such as a sedan, a coupe, a truck, a sport utility, a crossover, a van, a minivan, etc. As part of a driver assist system or an advanced driver assist system (ADAS), computer/ECU 104 may include programming to operate one or more of vehicle 102 brakes, propulsion (e.g., control of acceleration in the vehicle 102 by controlling one or more of an internal combustion engine, electric motor, hybrid engine, etc. and control power delivery therefrom), steering, climate control, interior and/or exterior lights, etc., as well as to determine whether and when the computer, as opposed to a human operator, is to control such operations, such as by sending vehicle data over the vehicle network 112. Additionally, an ECU/computer 104 may be programmed to determine whether and when a human operator is to control such operations.

Vehicle computer 104 may include or be communicatively coupled to, e.g., via a vehicle network 112 such as a communications bus as described further below, more than one processor, e.g., included in sensors 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the vehicle computer 104 in this disclosure.

The vehicle network 112 is a network via which messages, i.e., in the form of one or more digital packets, can be exchanged between various devices in vehicle 102. The vehicle computer 104 can be generally programmed to send and/or receive, via vehicle network 112, messages to and/or from other devices in vehicle 102 e.g., any or all of ECUs, sensors, actuators, components, communications module, a human machine interface HMI, etc. Additionally, or alternatively, messages can be exchanged among various such other devices in vehicle 102 via a vehicle network 112. In cases in which the computer includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104, second vehicle 118, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or second vehicle 118, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to second vehicle 118 or infrastructure element (not illustrated) typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

A vehicle 102 in accordance with the present disclosure includes a plurality of sensors 108 that may support the driver assist or ADAS functions. For example, sensors 108 may include, but are not limited to, one or more wheel speed sensor, steering angle sensor, GPS sensor, driver-facing camera, back-seat camera, forward-facing camera, side-facing camera, rear-facing camera, ultrasonic parking assist sensor, short range RADAR, medium range RADAR, LiDAR, light sensor, rain sensor, accelerometer, wheel torque sensors, inertial sensor, yaw rate sensor, etc. Sensors 108 can support functions that uses cameras to detect lane lines and road curvature, sometimes in conjunction with detailed mapping data. Sensors 108 may also support a lane keep assist (LKA) or lane centering assist (LCA) function that uses one or more cameras to detect lane lines and a steering angle sensor or support a drive assist function that uses one or more cameras to detect lane lines or monitor blind spots, a steering angle or position sensor, and a driver monitoring system camera (DMSC). Sensors 108 may also support an adaptive cruise control (ACC) function that uses wheel speed sensors/GPS and/or cameras/medium range RADAR/LiDAR to support an automatic follow distance function. Sensors 108 may also support an intelligent adaptive cruise control (iACC) function that uses accelerometers, wheel speed sensors/GPS, cameras, and/or RADAR/LiDAR to support cruise control functions that alter vehicle speed based upon detected speed limits, accelerations, and road curvature. Sensors 108 can support a parking assist function that uses steering sensors, cameras, and/or ultrasonic sensors. Sensors 108 may also support more common driver assist systems such as ABS, ESC, TCS, and roll stability control (RSC).

In some of these operations, sensors 108 such as a camera, RADAR sensor, ultrasonic sensor, and/or LiDAR sensor of the vehicle 102 may detect the position and height of objects relative to the position, height, and angle of the sensor 108 mounted on the body of vehicle 102, including but not limited to the position of lane lines, curbs, overhead signs, speed limit signs, overpasses, and other vehicles.

A vehicle 102 in accordance with the present disclosure includes one or more driver assist systems (or ADAS) is provided to support the driver assist operation. Driver assist systems can rely on data from sensors 108 for various operations, including determining parameters for such as a vehicle speed, vehicle steering angle, data concerning proximate objects (e.g., location, speed, heading, pose, etc.), etc. Driver assist settings 105 may be used to modify the operation of one or more of the driver assist systems. For example, driver assist settings may include, without limitation, a parameter such as a follow distance of an adaptive cruise control, an acceleration or deceleration rate of the adaptive cruise control, a lane change setting of the adaptive cruise control, a sensitivity or activation distance of an emergency braking system, a sensitivity or distance of a lane keeping system, a sensitivity or distance of a rear cross traffic alert system, and/or a sensitivity or distance of a blind spot monitoring system.

Figure 2:
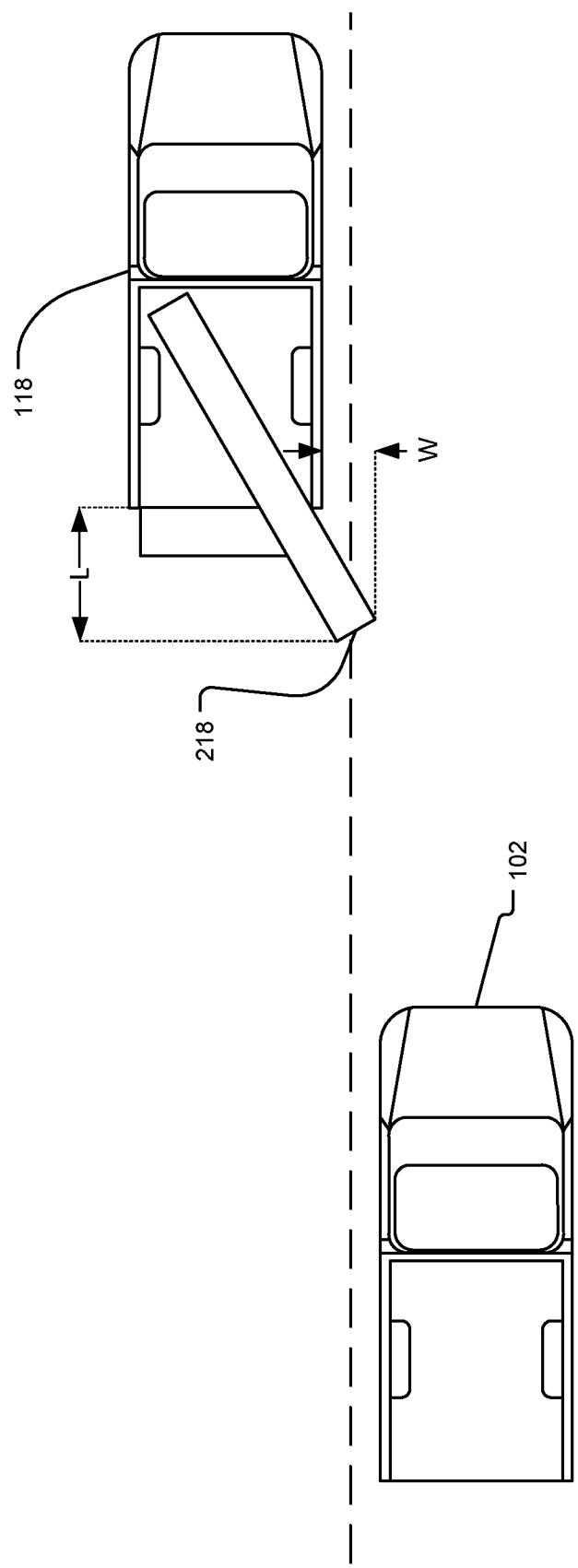
FIG. 2 is an overhead diagram of an example of a first vehicle sharing a roadway with a second vehicle having a cargo overhang condition.

With reference to FIG. 2, an overhead diagram of an example of a vehicle 102 sharing a roadway with a second vehicle 118 having a cargo 218 in an overhang condition is illustrated. For simplicity, the vehicles 102 and 118 are shown without fender flares or mirrors or other elements that could affect the unladed envelope of the vehicles 102 and 118, but vehicle envelopes may also account for such elements.

Second vehicle 118 in this example is illustrated as a pickup truck in which cargo 218 is shown as extending from a bed of the pickup truck in which the tailgate is lowered and the cargo extends beyond a perimeter or envelope of the second vehicle 118 by a length dimension L and by a width dimension W comprising the cargo overhang condition. However, this is but one example, and in a case with the tailgate up, the cargo 218 may also extend above the vehicle 102 by a height dimension H (not shown). The overhang condition may extend both behind and in front of the second vehicle 118 in the length direction and may extend from one or both sides of the second vehicle 118 in a width direction.

Moreover, the second vehicle 118 is not limited to a pickup truck and may be any suitable type of ground vehicle, e.g., a passenger or commercial automobile such as a sedan, a coupe, a truck, a sport utility (SUV), a crossover (CUV), a van, a minivan, etc. The cargo may be carried in any suitable manner, including but not limited to a truck bed, a bed extender, an opened cargo area, a rear rack (e.g., hitch-mounted rack, trunk-mounted rack, hatch-mounted rack, etc.), a roof rack, or a bed rack.

Examples of the cargo 218 include, but are not limited to, lumber, pipes, ladders, bedding, rooftop boxes, rooftop tents, bicycles, skis, paddleboards, surfboards, canoes, kayaks, coolers, and rear storage boxes as well as machinery such as buckets, booms, conveyors, compressors, winches, and mixers affixed to trucks.

In the example of FIG. 2, vehicle 102 is illustrated as behind second vehicle 118 and in a lane adjacent to the one in which the second vehicle 118 is traveling. However, the present disclosure also includes situations when the vehicle 102 is traveling in the same lane as second vehicle 118 or traveling next to the second vehicle 118. As shown in FIG. 2, the cargo 218 overhanging by length L and width W decreases the effective distance between vehicle 102 and second vehicle 118. As such, it may be desired to adjust operation of the vehicle 102 to account for this decreased effective distance.

Additionally, the second vehicle 118 may adjust its own operation, such as to prevent cargo 218 shifting from higher acceleration, deceleration, or slew rates, or to modify its lane-centering behavior. As such, it may also be beneficial to adjust operation of the vehicle 102 to account for such operation from the second vehicle 118, as discussed further below.

With reference to FIG. 3, a flow diagram of an example cargo overhang condition process 300 in a second vehicle 118 is illustrated.

In a first block 305, the second vehicle 118 is loaded with cargo 218 that extends beyond a perimeter or envelope of the second vehicle 118.

Next, in block 310, a computer 104 in the second vehicle 118 determines that a cargo overhang condition exists. This may be determined based on, for example, input from a camera or other sensor 108, or input from a user on an HMI of the second vehicle 118.

In a block 315, the computer 104 in the second vehicle 118 may adjust one or more operation of the second vehicle 118. In non-limiting examples, this may include the computer 104 of the second vehicle 118 adjusting a driver assistance system, including adjusting a parameter such as a distance of a parking assist system, a follow distance of an adaptive cruise control, a cornering speed of the adaptive cruise control, a slew rate of the adaptive cruise control, an acceleration or deceleration rate of the adaptive cruise control, a lane change setting of the adaptive cruise control, a sensitivity or activation distance of an emergency braking system, a sensitivity or distance of a lane keeping system, a sensitivity or distance of a rear cross traffic alert system, and/or a sensitivity or distance of a blind spot monitoring system.

Then, in a block 320, the computer 104 of second vehicle 118 sends a cargo overhang condition message to vehicles nearby. In one example, the computer 104 of second vehicle 118 instructs the communication module 110 to send the message over a short range V2V communication channel. The computer 104 may also instruct a lighting subsystem of the second vehicle 118 to operate the flashing hazard lights of the second vehicle 118 to assist other vehicles in determining which vehicle has the cargo overhang condition. In another example, the computer instructs the lighting subsystem of the second vehicle 118 to operate the flashing hazard lights of the second vehicle 118 to send the message via a code, such as Morse code. In this manner, nearby vehicles may receive the message via cameras and identify the vehicle having the cargo overhang condition at the same time. Alternately, the message may be sent by V2V transmission and the hazard light used to send a simple code to identify the source of the message.

With reference to FIG. 4, a flow diagram of an example cargo overhang condition operation 400 in a first vehicle 102 is illustrated.

In a first block 405, the vehicle 102 receives a cargo overhang condition message from the second vehicle 118. The message may include the various dimensions, i.e., the length L (with direction forward and/or rearward), the width W (with direction right or left), and/or the height H of the cargo overhang condition. The message may further include a vehicle identifier or position information to assist other vehicles in identifying the second vehicle 118. In one implementation, the message is received by the communication module 110 of the vehicle 102 over a wireless short range V2V communication channel. In another implementation, the message may be received by a camera in vehicle 102, wherein information is encoded in the flashing hazard lights of the second vehicle 118 and decoded by the computer 104 of vehicle 102.

Next, in block 410, the vehicle 102 may visually identify the second vehicle 118 that has the cargo overhang condition. In one implementation, the second vehicle 118 operates its flashing hazard lights to permit a camera of vehicle 102 to identify the second vehicle 118. In another implementation, the cargo overhang condition message from the second vehicle 118 may include precise GPS location data that may be used by a GPS subsystem of the vehicle 102 to identify the second vehicle 118.

Then, in a block 415, the computer 104 of vehicle 102 adjusts an operation of vehicle 102. In an implementation, this is done when it is determined that the vehicle 102 is behind or laterally adjacent to the second vehicle 118. As used herein, "behind" is limited to a zone within a reasonable distance behind the second vehicle and may be functionally limited due to the short-range nature of the V2V communication channel and the various disclosed methods of determining the location of the second vehicle 118 (e.g., line of sight for flashing lights). Also as used herein, "laterally adjacent" includes a longitudinal overlap of the perimeters or envelopes of the vehicles 102 and 118 as well as having any zone of concern, such as a blind spot monitoring zone of the vehicle 102 overlap with the perimeter or envelope of second vehicle 118.

The adjusted operation of vehicle 102 may be to adjust one or more driver assistance system. For example, the vehicle computer 104 of vehicle 102 may adjust an operation by adjusting a follow distance of an adaptive cruise control, an acceleration or deceleration rate of the adaptive cruise control, a lane change setting of the adaptive cruise control, a sensitivity or activation distance of an emergency braking system, a sensitivity or distance of a lane keeping system, a sensitivity or distance of a rear cross traffic alert system, and/or a sensitivity or distance of a blind spot monitoring system. Since the second vehicle may adjust operation of corresponding driver assist systems, such adjustments to the vehicle 102 may result in smoother operation of both vehicles (e.g., fewer system interventions) and allow sufficient distance between the vehicles 102 and 118.

In a block 420, when the vehicle 102 has passed the second vehicle 118 and the second vehicle 118 is no longer in a zone of concern of the sensors 108 of the vehicle 102, the computer 104 of vehicle 102 may revert operation of the vehicle 102 to a state prior to the adjustment.

With reference to FIG. 5, a flow diagram of an example combined process 500 to adjust an operation of a first vehicle 102 based on a cargo overhang condition of a second vehicle 118 is illustrated.

In a first block 505, a second vehicle 118 determines that it has a cargo overhang condition. As discussed with respect to FIG. 3, this may be accomplished by various methods and devices.

Next, in block 510, the second vehicle 118 sends a cargo overhang condition message to nearby vehicles. As discussed with respect to FIG. 3, this may be accomplished by various methods and devices.

In block 515, a first vehicle 102 among the nearby vehicles receives the cargo overhang condition message. As discussed with respect to FIG. 4, this may be accomplished by various methods and devices.

Then, in block 520, the first vehicle 102 adjusts an operation based upon the cargo overhang condition described in the cargo overhang condition message. As discussed with respect to FIG. 4, this may be accomplished by various methods and devices.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system, such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising a computer for a first vehicle, the computer having a processor and a memory storing instructions executable by the processor to:
   receive a message from a second vehicle, the message including a cargo overhang condition of the second vehicle in which an object carried by the second vehicle extends beyond a perimeter or envelope of the second vehicle; and
   adjust an operation of the first vehicle based upon the cargo overhang condition of the second vehicle;
   wherein the operation includes an adaptive cruise control and the instructions include instructions to adjust a follow distance of the adaptive cruise control and/or an acceleration or deceleration rate of the adaptive cruise control based on the cargo overhang condition.

2. The system of claim 1, wherein the instructions include instructions to adjust a parameter selected from a lane change setting of the adaptive cruise control, a sensitivity or activation distance of an emergency braking system, a sensitivity or distance of a lane keeping system, a sensitivity or distance of a rear cross traffic alert system, and/or a sensitivity or distance of a blind spot monitoring system.

3. The system of claim 1, wherein the cargo overhang condition includes overhang dimensions in a length direction, in a width direction, and/or in a height direction.

4. The system of claim 1, further comprising instructions to visually identify the second vehicle.

5. The system of claim 4, wherein the instructions to visually identify the second vehicle includes instructions to detect flashing hazard lights of the second vehicle with a camera on the first vehicle.

6. The system of claim 5, wherein the instructions to detect flashing hazard lights of the second vehicle includes instructions to detect a code in a pattern of the flashing hazard lights.

7. The system of claim 1, wherein the message from the second vehicle is received at the first vehicle using a short-range vehicle-to-vehicle (V2V) wireless communication.

8. The system of claim 1, wherein the message from the second vehicle is received at the second vehicle in a coded transmission from a controlled flashing of hazard lights on the second vehicle.

9. The system of claim 1, wherein the instructions to adjust the operation of the first vehicle are configured to operate when the first vehicle is behind or laterally adjacent to the second vehicle.

10. A method performed at a first vehicle comprising:
    receiving a message from a second vehicle, the message including a cargo overhang condition of the second vehicle in which an object carried by the second vehicle extends beyond a perimeter or envelope of the second vehicle; and
    adjusting an operation of the first vehicle based upon the cargo overhang condition of the second vehicle;
    wherein the operation includes an adaptive cruise control and the instructions include instructions to adjust a follow distance of the adaptive cruise control and/or an acceleration or deceleration rate of the adaptive cruise control based on the cargo overhang condition.

11. The method of claim 10, wherein adjusting the operation includes adjusting a parameter selected from a lane change setting of the adaptive cruise control, a sensitivity or activation distance of an emergency braking system, a sensitivity or distance of a lane keeping system, a sensitivity or distance of a rear cross traffic alert system, and/or a sensitivity or distance of a blind spot monitoring system.

12. The method of claim 10, wherein the cargo overhang condition includes overhang dimensions in a length direction, in a width direction, and/or in a height direction.

13. The method of claim 10, further comprising visually identifying the second vehicle.

14. The method of claim 13, wherein visually identifying the second vehicle includes instructions to detect flashing hazard lights of the second vehicle with a camera on the first vehicle.

15. The method of claim 14, wherein detecting flashing hazard lights of the second vehicle includes detecting a code in a pattern of the flashing hazard lights.

16. The method of claim 10, wherein the message from the second vehicle is received at the first vehicle using a short-range vehicle-to-vehicle (V2V) wireless communication.

17. The method of claim 10, wherein the message from the second vehicle is received at the second vehicle in a coded transmission from a controlled flashing of hazard lights on the second vehicle.

18. The method of claim 10, wherein the adjusting of the operation of the first vehicle operates when the first vehicle is behind or laterally adjacent to the second vehicle.

* * * * *